W. Avery,
Saw-Set,
Nº 15,679.  Patented Sep. 9, 1856.
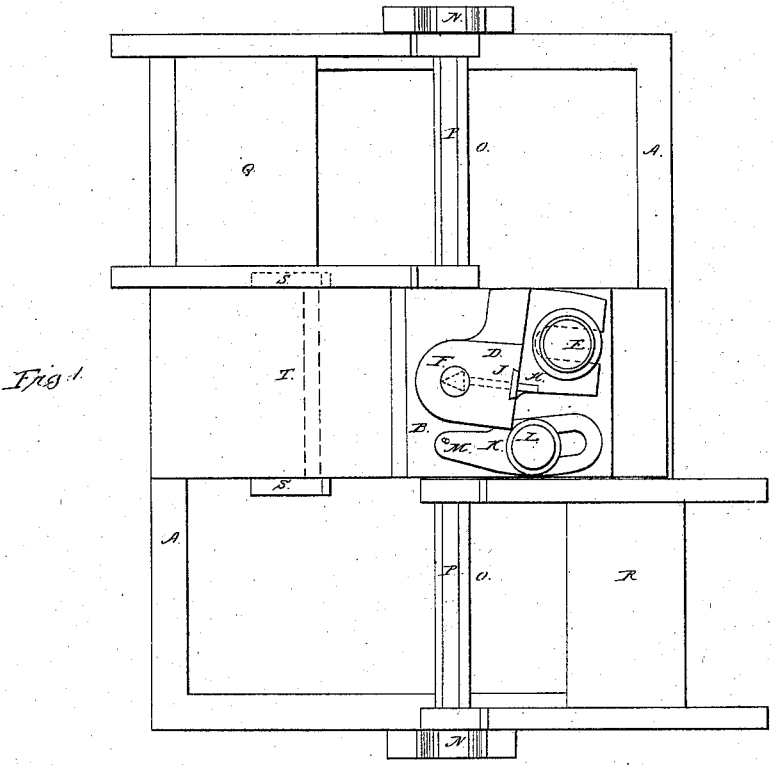
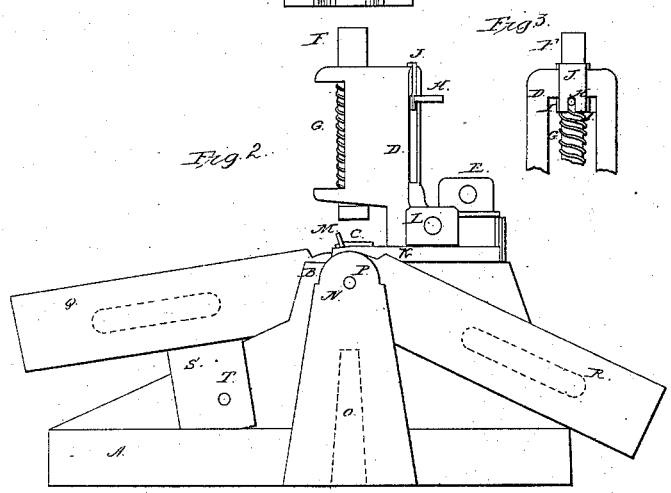

UNITED STATES PATENT OFFICE.

WYLLYS AVERY, OF SALISBURY CENTER, NEW YORK.

SAW-SET.

Specification of Letters Patent No. 15,679, dated September 9, 1856.

*To all whom it may concern:*

Be it known that I, WYLLYS AVERY, of Salisbury Center, in the county of Herkimer and State of New York, have invented certain new and useful Improvements in Machines for Setting Saws; and I do hereby declare that the same are described and represented in the following specifications and drawings.

To enable others skilled in the art to make and use my improvements I will proceed to describe their construction and operation, referring to the drawings, in which the same letters indicate like parts in each of the figures.

Figure 1 is a plan of the machine and Fig. 2 an elevation of one end.

The nature of my invention and improvements consist in arranging a traversing punch so that it can be vibrated or turned to suit the form or position of the saw teeth being set, and in an adjustable pin which acts in the scores between the teeth of the saw to govern its position endwise and edgewise or in each direction on the anvil under the setting punch; also in some removable adjustable vibrating frames, which support the saw and sustain it in a proper position during the process of setting; lastly in some revolving blocks to adjust the abovementioned frame which support the saw while it is being set.

In the accompanying drawings A is a rectagular frame of cast iron with the anvil block B, across the middle of the frame, made in the form shown in the drawing or of such other form as will answer the purpose. This block B is perforated to receive the small anvil C, which is beveled on one side, as shown in Fig. 2. The stand D may be made in the form shown in the drawing and provided with a score or slot for the screw E, which screws into the block B, to hold the stand D, in a proper position. The stand D, is perforated for the punch F, which is fitted to traverse freely in the stand, which punch is raised and held up by the spiral spring G, which acts against the pin H, in the punch, so as to hold it up out of the way of the saw being set on the anvil. The lower end of the punch F, is triangular and it may be set to suit the angles of the saw teeth, being set by placing the pin H, in one of the scores I, I, in the back of the stand D, as shown in Fig. 3, which represents the back of the stand which contains the piece J, (with a score in the center) fitted to a dovetailing score in the stand D, so as to fasten it by driving down into the score to which it is fitted, so as to leave a score each side of its lower end for the pin H to traverse in, or it may traverse in the center of the piece J.

The slide K, is provided with a slot for the screw L, which fastens it to the block B, by the side of the stand D. This slide carries the pin M, which enters the scores between the teeth of the saw, so as to govern the position of the teeth on the anvil C, under the punch D, both endwise and edgewise, and is far better than the devices heretofore used, which act against the ends of the teeth.

The stands N, N, at each end of the frame A, are connected to the block B by the bars O, O, and support the outer ends of the rods P, P, upon which the supporting frames Q, and R, vibrate which support the plate of the saw while it is being set, the angle of these frames being increased or diminished to suit the saw being set, by turning the blocks S, S, upon which the frames rest, these blocks being perforated nearest to one corner, and fastened to the rod T, shown by broken lines in Fig. 1, and fitted to turn in the block B', as shown in the drawing.

To set a saw, adjust the frames Q, and R, to the desired angle by turning the blocks S, S, then place the saw upon them and set the punch D, to suit the angle of the teeth by putting the pin H, in the score best suited for that purpose, then set the pin M so that when it is in a score between the teeth one of the teeth will be in a proper position on the anvil under the pump and fasten the slide K, so as to hold the pin in that position. Now strike the punch with a hammer to set the tooth under it, then move it for another and press it, the saw, against the pin M, to govern its position on the anvil both endwise and edgewise for each tooth set. If the saw has a handle which would hit either of the frames Q, or R, they may be turned back to the position in which R, is shown in the drawing, so as to be out of the way, while the frame Q, governs the position of the saw to complete the setting.

Some of the advantages of my machine may be enumerated as follows, to wit: The saw in my machine is kept in one uniform position on the supporting frames, while being set, so that each of the teeth may be brought successively to the same position on the anvil, and set at precisely to the same angle. By turning the punch to suit the form of the spaces between the teeth, and reversing it when the saw is reversed the teeth are more perfectly set than they could be with a punch that does not turn. The saw is governed by a pin in which passes in between the teeth. Therefore the points of the teeth are not dulled as in the old machines; besides the position of the saw is governed endwise, as well as edgewise. The supporting frame for the saw is made in two parts, so as to turn one part back when the handle interferes, and leave a large supporting surface to hold the saw, which cannot be done where the saw is supported by a single point. The revolving blocks enable the operator to adjust both parts of the supporting frame with the greatest facility.

The machine is so simple in its construction that it can be operated nearly as well by a novice as an adept.

With the use of my machine a saw can be more perfectly set in far less time than by any other machine heretofore in use within my knowledge.

I believe I have described and represented the construction, operation and use of my improvements in saw sets, so as to enable any person skilled in the art to make and use them. I will now specify what I desire to secure by Letters Patent, to wit:

I claim—

1. A traversing punch arranged so that it can be vibrated or turned to suit the form or position of the saw teeth being set substantially as described.

2. I do not claim a vibrating pin acting upon the teeth of the saw to traverse it endwise, but what I do claim is the adjustable stationary pin M, so arranged as to bring the teeth of the saw into a proper position under the setting punch when the scores between the teeth of the saw are forced onto said pin substantially as described.

3. I do not claim a vibrating frame to support the saw hung directly opposite the setting punch and anvil, but what I do claim is two separate frames, one hung each side of the anvil and setting punch, so arranged that when one is turned back out of the way of the handle, the other will support and sustain the saw substantially as described.

4. I claim the revolving blocks for adjusting the above mentioned frames, which support the saw during the process of setting substantially as described.

WYLLYS AVERY.

Witnesses:
D. D. COAL,
JAMES BROWN.